US012802953B2

(12) United States Patent
McAlister et al.

(10) Patent No.: US 12,802,953 B2
(45) Date of Patent: Nov. 17, 2026

(54) SYSTEMS AND METHODS FOR PERFORMING DATA-DEPENDENT TANDEM MASS SPECTROMETRY

(71) Applicant: Thermo Finnigan LLC, San Jose, CA (US)

(72) Inventors: Graeme C. McAlister, San Jose, CA (US); Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 352 days.

(21) Appl. No.: 18/636,916

(22) Filed: Apr. 16, 2024

(65) Prior Publication Data

US 2025/0323030 A1 Oct. 16, 2025

(51) Int. Cl.

*H01J 49/00* (2006.01)
*G01N 30/72* (2006.01)
*G01N 30/02* (2006.01)

(52) U.S. Cl.

CPC ........ *H01J 49/004* (2013.01); *G01N 30/7233* (2013.01); *G01N 2030/027* (2013.01)

(58) Field of Classification Search

CPC .......... H01J 49/00; H01J 49/02; H01J 49/004; H01J 49/0045; H01J 49/0077; H01J 49/0081; H01J 49/0086; H01J 49/009; H01J 49/0031; G01N 30/02; G01N 30/06; G01N 30/72; G01N 30/7233; G01N 30/8679; G01N 30/8693; G01N 30/8696; G01N 2030/027; G01N 2030/065

USPC ................................ 250/281, 282, 299, 300
See application file for complete search history.

(56) References Cited

U.S. PATENT DOCUMENTS

| | | | | |
|---|---|---|---|---|
| 11,587,774 | B2 | 2/2023 | McAlister | |
| 2011/0111443 | A1* | 5/2011 | Nishimura | G01N 33/6848 506/40 |
| 2012/0261568 | A1* | 10/2012 | Coon | G16B 40/10 250/288 |
| 2014/0336951 | A1* | 11/2014 | Coon | H01J 49/0031 702/23 |
| 2018/0166263 | A1* | 6/2018 | Tate | H01J 49/0036 |
| 2020/0013609 | A1 | 1/2020 | Tate | |
| 2022/0013609 | A1* | 1/2022 | Won | H10K 59/122 |
| 2022/0093378 | A1* | 3/2022 | McAlister | H01J 49/0031 |

FOREIGN PATENT DOCUMENTS

| | | | |
|---|---|---|---|
| GB | 2585372 | A | 1/2021 |
| WO | WO-2025133631 | A1 | 6/2025 |

OTHER PUBLICATIONS

EP25170158.7, Extended European Search Report, Sep. 10, 2025, 11 pages.

* cited by examiner

*Primary Examiner* — Jason L Mccormack

(57) ABSTRACT

An illustrative method of performing data-dependent tandem mass spectrometry includes a mass spectrometer acquiring an MS1 mass spectrum of ions produced from a sample, determining, based on the MS1 mass spectrum, a set of observed precursor ions, determining expected fragment ions for the set of observed precursor ions, and acquiring one or more MS2 mass spectra for select ions observed in the MS1 mass spectrum, wherein the expected fragment ions are excluded from being selected for MS2 analysis.

20 Claims, 8 Drawing Sheets

SYSTEMS AND METHODS FOR PERFORMING DATA-DEPENDENT TANDEM MASS SPECTROMETRY

BACKGROUND INFORMATION

A mass spectrometer is a sensitive instrument that may be used to detect, identify, and/or quantify molecules based on their mass-to-charge ratio (m/z). A mass spectrometer generally includes an ion source for generating ions from components included in a sample, a mass analyzer for separating the ions based on their m/z, and an ion detector for detecting the separated ions. The mass spectrometer may be connected to a computer-based software platform that uses data from the ion detector to construct a mass spectrum that represents a relative abundance of each of the detected ions as a function of m/z. The m/z of ions may be used to detect and quantify molecules in simple and complex mixtures. A separation device such as a liquid chromatograph, gas chromatograph, or capillary electrophoresis device may be coupled to the mass spectrometer to separate components included in the sample before the components are introduced to the mass spectrometer.

Tandem mass spectrometry is a technique that analyzes, in two or more successive stages, ions produced by the fragmentation, activation, and/or dissociation of precursor ions and/or product ions (e.g., ions produced by dissociation or fragmentation of precursor ions that were formed themselves by earlier or intermediate dissociation or fragmentation stages). Tandem mass spectrometry most often occurs in two stages and is typically referred to as mass spectrometry/mass spectrometry (MS/MS or MS2). In a data-dependent acquisition (DDA) procedure for tandem mass spectrometry, a survey acquisition (e.g., a full-spectrum MS scan) is performed (typically referred to as an MS1 scan or acquisition). A number of precursor ions whose m/z values were recorded in the MS1 scan are selected, using predetermined rules, and subjected to one or more additional stages of mass analysis to generate product ion mass spectra. These additional stages of mass analyses are typically referred to as MS/MS or MS2 scans, acquisitions, or analyses.

The DDA procedure makes efficient use of resources of the mass spectrometer by performing a costly MS2 analysis on a selected m/z only when the presence of a component of interest eluting from the separation device is confirmed by the survey acquisition. However, such efficiencies are curtailed when certain ions observed in the survey acquisition, such as product ions observed in the survey acquisition, are inadvertently selected for MS2 analyses. MS2 analyses of such product ions uses resources of the mass spectrometer to produce redundant or uninformative mass spectra data.

SUMMARY

The following description presents a simplified summary of one or more aspects of the methods and systems described herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, a system comprises a memory storing instructions and a processor communicatively coupled to the memory and configured to execute the instructions to: direct a mass spectrometer to acquire an MS1 mass spectrum of ions produced from a sample; determine, based on the MS1 mass spectrum, a set of observed precursor ions; determine expected fragment ions for the set of observed precursor ions; add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.

In some illustrative embodiments, a non-transitory computer-readable medium stores instructions that, when executed, direct at least one processor of a computing device to: direct a mass spectrometer to acquire an MS1 mass spectrum of ions produced from a sample; determine, based on the MS1 mass spectrum, a set of observed precursor ions; determine expected fragment ions for the set of observed precursor ions; add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.

In some illustrative embodiments, a computer program product embodied on a non-transitory computer-readable medium comprises instructions that, when executed, direct at least one processor of a computing device to: direct a mass spectrometer to acquire an MS1 mass spectrum of ions produced from a sample; determine, based on the MS1 mass spectrum, a set of observed precursor ions; determine expected fragment ions for the set of observed precursor ions; add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.

In some illustrative embodiments, a method of performing data-dependent tandem mass spectrometry comprises: acquiring, by a mass spectrometer, an MS1 mass spectrum of ions produced from a sample; determining, by the mass spectrometer and based on the MS1 mass spectrum, a set of observed precursor ions; determining, by the mass spectrometer, expected fragment ions for the set of observed precursor ions; and acquiring, by the mass spectrometer, one or more MS2 mass spectra for select ions observed in the MS1 mass spectrum, wherein the expected fragment ions are excluded from being selected for MS2 analysis.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
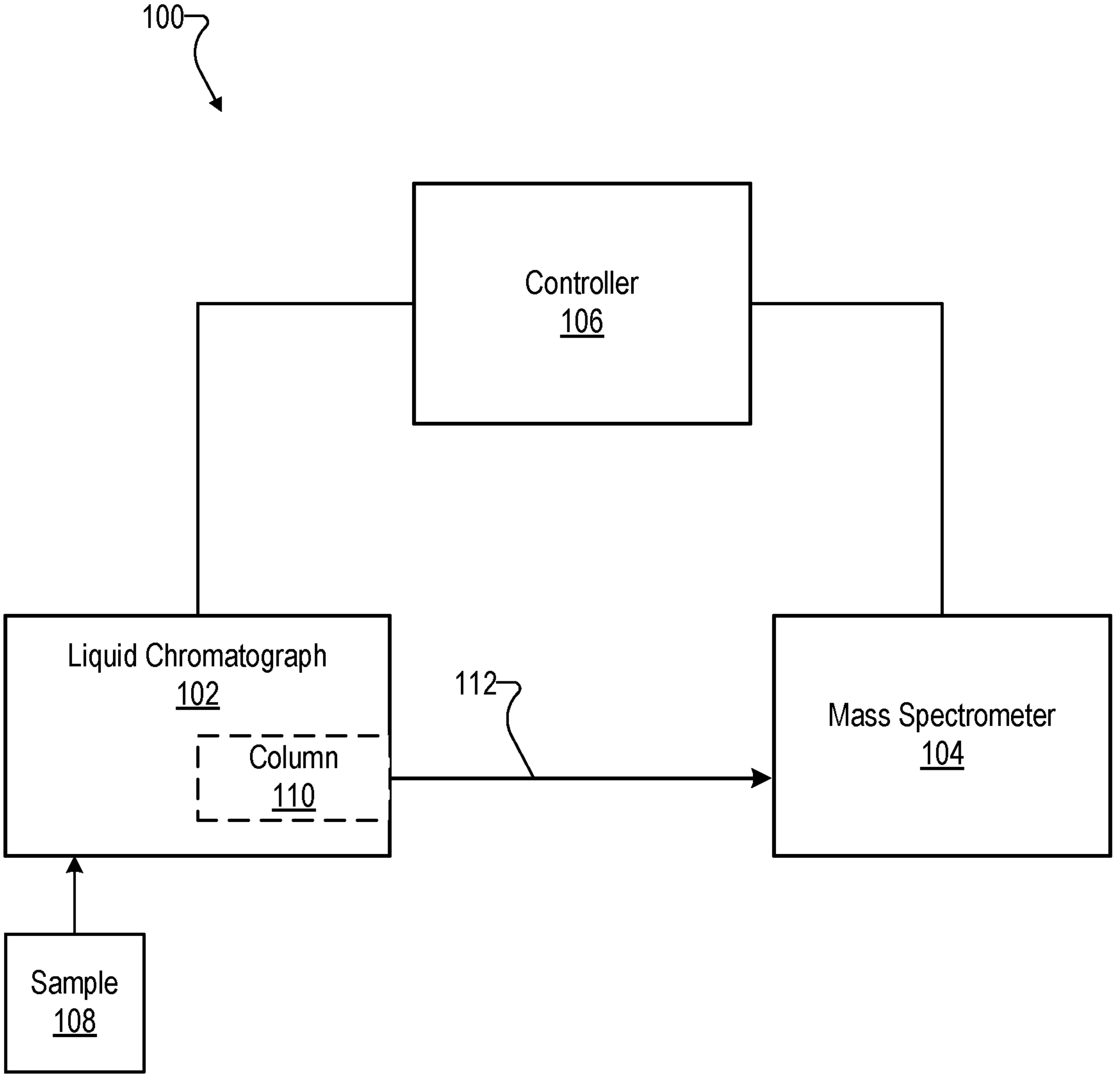
FIG. 1 shows an illustrative liquid chromatography-mass spectrometry system including a liquid chromatograph and a mass spectrometer.

Methods and systems for performing data-dependent acquisition (DDA) tandem mass spectrometry are described herein. In some illustrative embodiments, a method of performing DDA tandem mass spectrometry includes a mass spectrometer performing an MS1 survey scan to acquire an MS1 mass spectrum of ions produced from a sample, determining a set of observed precursor ions based on the MS1 mass spectrum, determining expected fragment ions for the set of observed precursor ions, and excluding the expected fragment ions from MS2 analysis (e.g., by excluding m/z values corresponding to the expected fragment ions from being selected for data-dependent MS2 analysis, even when signals for those m/z values detected in the MS1 mass spectrum satisfy other MS2 analysis selection criteria such as an intensity threshold, a charge state requirement, an expected isotope distribution, etc.).

Use of the MS1 mass spectrum to determine expected fragment ions for observed precursor ions allows the m/z values of the expected fragment ions to be used by the mass spectrometer to exclude, from MS2 analysis, product ions that are observed in the MS1 mass spectrum and to focus MS2 analysis time and effort specifically on targeting higher value precursor ions. Such product ions in the MS1 spectrum can be formed during a variety of mass spectrometer events prior to MS2 fragmentation such as ionization, ion transfer, or ion trapping prior to MS1 analysis, or as a result of in-source dissociation. In most cases, these product ions observed in the MS1 mass spectrum, when subjected to MS2 analysis, provide only information that is redundant to information that is obtained by subjecting intact precursor ions to MS2 analysis. More informative data is usually produced by the mass spectrometer selecting an intact precursor ion for MS2 analysis rather than selecting a product ion for MS2 analysis. As such, inadvertently subjecting product ions to MS2 analysis effectively slows down the mass spectrometer and may prevent the mass spectrometer from selecting more helpful or informative ions from the MS1 mass spectrum for MS2 analysis. Acquisition of uninformative MS2 mass spectra for product ions observed in the MS1 mass spectrum is an inefficient use of mass spectrometer resources and may reduce the sensitivity or the limit of detection (LOD) of the mass spectrometer.

Systems and methods described herein may provide various benefits, which may include one or more advantages over conventional systems and methods for performing DDA tandem mass spectrometry. For example, product ions observed in an MS1 mass spectrum may be actively excluded from MS2 analyses even when signals for those observed product ions satisfy typical MS2 analysis criteria (e.g., an intensity threshold, a charge state requirement, an expected isotope distribution, etc.). The exclusion of these potential product ions in the MS1 spectrum from MS2 analysis allows the resources of the mass spectrometer to be efficiently allocated to performing MS2 analyses on MS1 precursors that are more likely to be intact precursor ions that produce more informative data. Compared to conventional systems and methods for performing data-dependent tandem mass spectrometry, systems and methods described herein may improve the results and/or efficiencies of a data-dependent tandem mass spectrometry procedure performed by a mass spectrometer.

Various embodiments will now be described in more detail with reference to the figures. The systems and methods described herein may provide one or more of the benefits mentioned above and/or various additional and/or alternative benefits that will be made apparent herein.

In some implementations, the methods and systems for performing data-dependent tandem mass spectrometry, as described herein, may be used in conjunction with a combined separation-mass spectrometry system, such as a liquid chromatography-mass spectrometry (LC-MS) system. As such, an LC-MS system will now be described. The described LC-MS system is illustrative and not limiting. The methods and systems described herein may operate as part of or in conjunction with the LC-MS system described herein and/or with any other suitable separation-mass spectrometry system, including a high-performance liquid chromatography-mass spectrometry (HPLC-MS) system, a gas chromatography-mass spectrometry (GC-MS) system, or a capillary electrophoresis-mass spectrometry (CE-MS) system.

FIG. 1 shows an illustrative LC-MS system 100. LC-MS system 100 includes a liquid chromatograph 102, a mass spectrometer 104, and a controller 106. Liquid chromatograph 102 is configured to separate, over time, components (e.g., analytes) within a sample 108 that is injected into liquid chromatograph 102. Sample 108 may include, for example, chemical components (e.g., molecules, ions, etc.) and/or biological components (e.g., metabolites, proteins, lipids, etc.) for detection and analysis by LC-MS system 100. Liquid chromatograph 102 may be implemented by any liquid chromatograph as may suit a particular implementation. In liquid chromatograph 102, sample 108 may be injected onto a column 110 and carried through column 110 by a mobile phase (e.g., a solvent). As the mobile phase passes through column 110, components within sample 108 elute from column 110 at different times based on, for example, their size, their affinity to the stationary phase, their polarity, and/or their hydrophobicity. A detector (e.g., a spectrophotometer) may measure the relative intensity of a signal modulated by each separated component in eluate 112 from column 110. Data generated by the detector may be represented as a chromatogram, which plots retention time on the x-axis and a signal representative of the relative intensity on the y-axis. The retention time of a component is generally measured as the period of time between injection of sample 108 onto column 110 and the relative intensity peak maximum after chromatographic separation. In some examples, the relative intensity may be correlated to or representative of relative abundance of the separated components. Data generated by liquid chromatograph 102 may be output to controller 106.

In some cases, particularly in analyses of complex mixtures, multiple different components in sample 108 may co-elute from column 110 at approximately the same time, and thus may have the same or similar retention times. As a result, determination of the relative intensity of the individual components within sample 108 requires further separation of the individual components. To this end, liquid chromatograph 102 directs components included in eluent 112 to mass spectrometer 104.

Mass spectrometer 104 is configured to ionize the components received from liquid chromatograph 102 and sort or separate the produced ions based on m/z of the ions. A detector in mass spectrometer 104 measures the intensity of the signal produced by the ions. As used herein, "intensity"

or "signal intensity" may refer to any suitable metric, such as abundance, relative abundance, ion count, intensity, relative intensity, etc. Data generated based on signals detected by the detector may be represented by mass spectra, which plot the intensity of the observed signal as a function of m/z of the ions. Data acquired by mass spectrometer 104 may be output to controller 106.

Mass spectrometer 104 may be implemented by any suitable mass spectrometer, such as a tandem mass spectrometer configured to perform tandem mass spectrometry (e.g., MS/MS), a multi-stage mass spectrometer configured to perform multi-stage mass spectrometry (denoted $MS^n$), a mass spectrometer with a single analyzer (e.g., a quadrupole ion trap capable of MS/MS and/or MSn), or a hybrid mass spectrometer that contains multiple analyzers, and the like.

Figure 2:
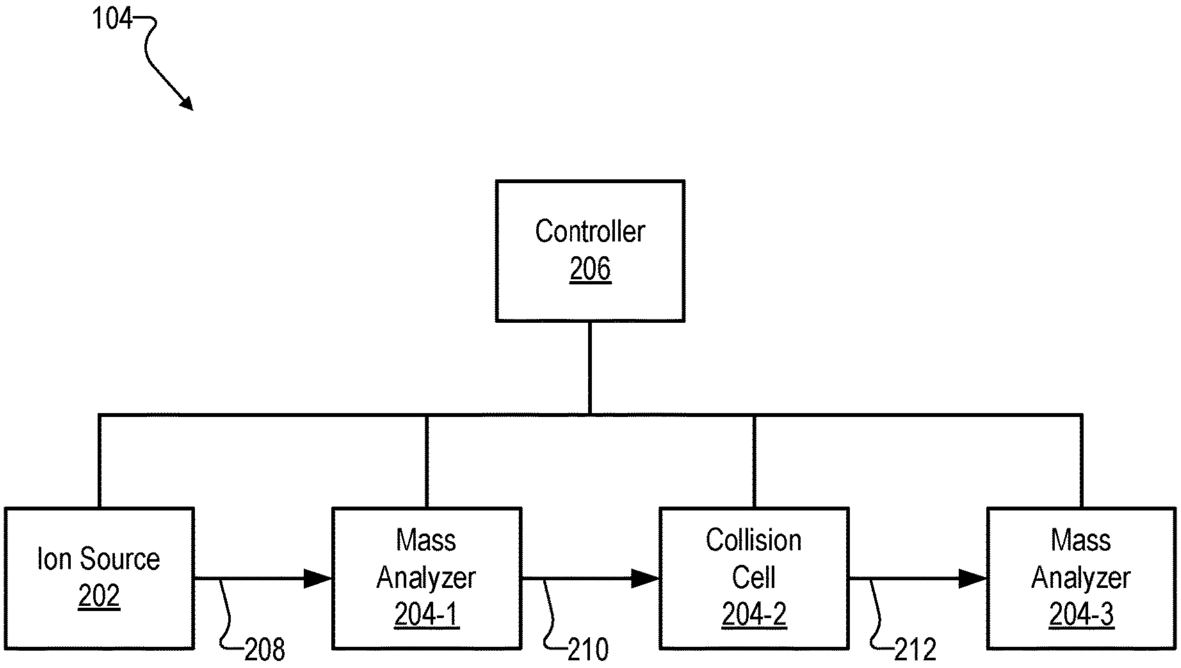
FIG. 2 shows an illustrative implementation of the mass spectrometer of FIG. 1.

FIG. 2 shows an illustrative implementation of mass spectrometer 104. As shown, mass spectrometer 104 is tandem-in-space (e.g., has multiple mass analyzers) and has two stages for performing MS/MS. However, mass spectrometer 104 is not limited to this configuration but may have any other suitable configuration. For example, mass spectrometer 104 may have a single mass analyzer and may be tandem-in-time. Additionally or alternatively, mass spectrometer 104 may be a multi-stage mass spectrometer and may have any suitable number of analyzers and/or stages (e.g., three or more) for performing multi-stage mass spectrometry (e.g., MS/MS/MS).

As shown, mass spectrometer 104 includes an ion source 202, a first mass analyzer 204-1, a collision cell 204-2, a second mass analyzer 204-3, and a controller 206. Mass spectrometer 104 may further include any additional or alternative components not shown as may suit a particular implementation (e.g., ion optics, filters, an autosampler, a detector, etc.).

Ion source 202 is configured to produce a stream 208 of ions from components of sample 108 and deliver the ions to first mass analyzer 204-1. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from components included in sample 108 and delivering the ions to first mass analyzer 204-1.

First mass analyzer 204-1 is configured to receive ion stream 208 and direct a beam 210 of ions (e.g., precursor ions) to collision cell 204-2. In an MS2 analysis, collision cell 204-2 is configured to receive beam 210 of ions and produce product ions (e.g., fragment ions) via one or more controlled dissociation processes. Collision cell 204-2 is further configured to direct a beam 212 of product ions to second mass analyzer 204-3. Second mass analyzer 204-3 is configured to filter and/or perform a mass analysis of the product ions.

Mass analyzers 204-1 and 204-3 are configured to separate ions according to m/z of each of the ions. Mass analyzers 204-1 and 204-3 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, a sector mass analyzer, and the like. In some embodiments, mass analyzers 204 may be implemented by the same type of mass analyzer. However, mass analyzers 204 need not be implemented by the same type of mass analyzer in other embodiments.

Collision cell 204-2 may be implemented by any suitable collision cell. As used herein, "collision cell" may encompass any structure or device configured to produce product ions via one or more controlled dissociation processes and is not limited to devices employed for collisionally-activated dissociation. For example, collision cell 204-2 may be configured to fragment precursor ions using collision induced dissociation, electron transfer dissociation, electron capture dissociation, photon induced dissociation, surface induced dissociation, ion/molecule reactions, and the like.

An ion detector (not shown) is configured to detect ions at each of a variety of different m/z and responsively generate a signal (e.g., an electrical signal or a photon-based signal) representative of ion intensity. The signal is transmitted to controller 206 for processing, such as to construct a mass spectrum of the sample. For example, mass analyzer 204-3 may emit an emission beam of separated ions to the ion detector, which is configured to detect the ions in the emission beam and generate or provide data that can be used by controller 206 to construct a mass spectrum of the sample. The ion detector may be implemented by any suitable detection device, including without limitation an electron multiplier, a Faraday cup, a photon-based detector, and the like. The ion detector may be implemented in the mass spectrometer in any suitable way, including as part of mass analyzer 204-3, for example.

Controller 206 may be communicatively coupled with and configured to control operations of ion source 202, mass analyzer 204-1, collision cell 204-2, and mass analyzer 204-3 of mass spectrometer 104. For example, controller 206 may be configured to control operation of various hardware components included in ion source 104, collision cell 204-2, and/or mass analyzers 204-1 and 204-3. To illustrate, controller 206 may be configured to control an accumulation time of ion source 202 and/or mass analyzers 204, control an oscillatory voltage power supply and/or a DC power supply to supply an RF voltage and/or a DC voltage to mass analyzers 204, adjust values of the RF voltage and DC voltage to select an effective m/z (including a mass tolerance window) for analysis, and adjust the sensitivity of the ion detector (e.g., by adjusting the detector gain).

Controller 206 may also include and/or provide a user interface configured to enable interaction between a user of mass spectrometer 104 and controller 206. The user may interact with controller 206 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 206. In other examples the display device and/or input device may be separate from, but communicatively coupled to, controller 206. For instance, the display device and the input device may be included in a computer (e.g., a desktop computer, a laptop computer, etc.) communicatively connected to controller 206 by way of a wired connection (e.g., by one or more cables) and/or a wireless connection.

Controller 206 may include any suitable hardware (e.g., a processor, circuitry, etc.) and/or software as may serve a particular implementation. While FIG. 2 shows that controller 206 is included in mass spectrometer 104, controller 206 may alternatively be implemented in whole or in part separately from mass spectrometer 104, such as by a computing device communicatively coupled to mass spectrometer 104 by way of a wired connection (e.g., a cable), a wireless connection, and/or a network (e.g., a local area network, a wireless network (e.g., Wi-Fi), a wide area network, the Internet, a cellular data network, etc.). In some examples, controller 206 may be implemented in whole or in part by controller 106.

Figure 3:
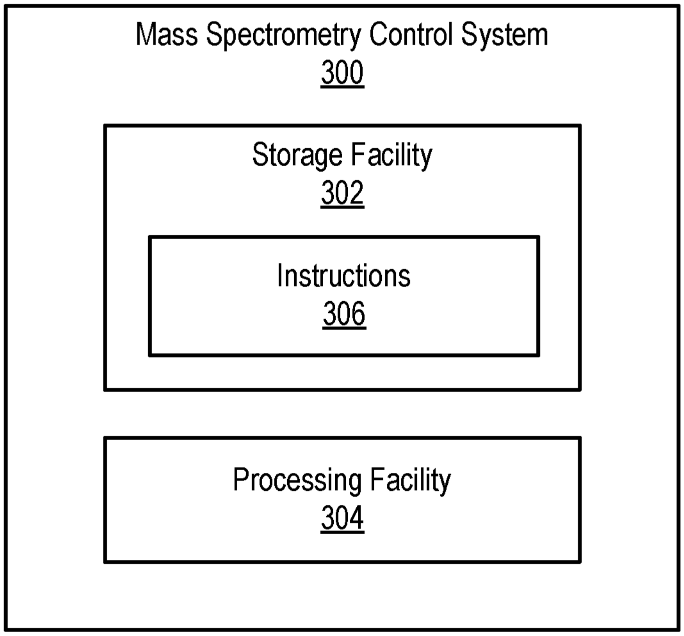
FIG. 3 shows an illustrative mass spectrometry control system.

Controller 206 may include or otherwise implement a mass spectrometry control system, which may be configured to perform one or more operations of data-dependent tandem mass spectrometry described herein. FIG. 3 shows an illustrative mass spectrometry control system 300 ("system 300"). System 300 may be implemented entirely or in part by LC-MS system 100 and/or mass spectrometer 104 (e.g., by controller 106 and/or controller 206). Alternatively, system 300 may be implemented separately from LC-MS system 100.

System 300 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform one or more of the illustrative operations described herein. For example, storage facility 302 may store instructions 306 that may be executed by processing facility 304 to perform one or more of the operations described herein. Instructions 306 may be implemented by any suitable application, software, code, and/or other executable data instance.

Storage facility 302 may also maintain any data acquired, received, generated, managed, used, and/or transmitted by processing facility 304. For example, storage facility 302 may maintain data acquired by processing facility 304 from one or more components of system 100 (e.g., acquired chromatogram data and/or mass spectra data), data acquired by processing facility 304 from one or more other sources, and/or data generated by processing facility 304. Any of the data described herein (e.g., any of the datasets described herein, such as mass spectra data) may be maintained by storage facility 302 and/or by a separate storage facility communicatively coupled to system 300.

Processing facility 304 may be configured to perform (e.g., execute instructions 306 stored in storage facility 302 to perform) various processing operations described herein. It will be recognized that the operations and examples described herein are merely illustrative of the many different types of operations that may be performed by processing facility 304. In the description herein, any references to operations performed by system 300 may be understood to be performed by processing facility 304 of system 300. Furthermore, in the description herein, any operations performed by system 300 may be understood to include system 300 directing or instructing another system or device (e.g., one or more components of mass spectrometer 104 or system 100) to perform the operations.

Figure 4:
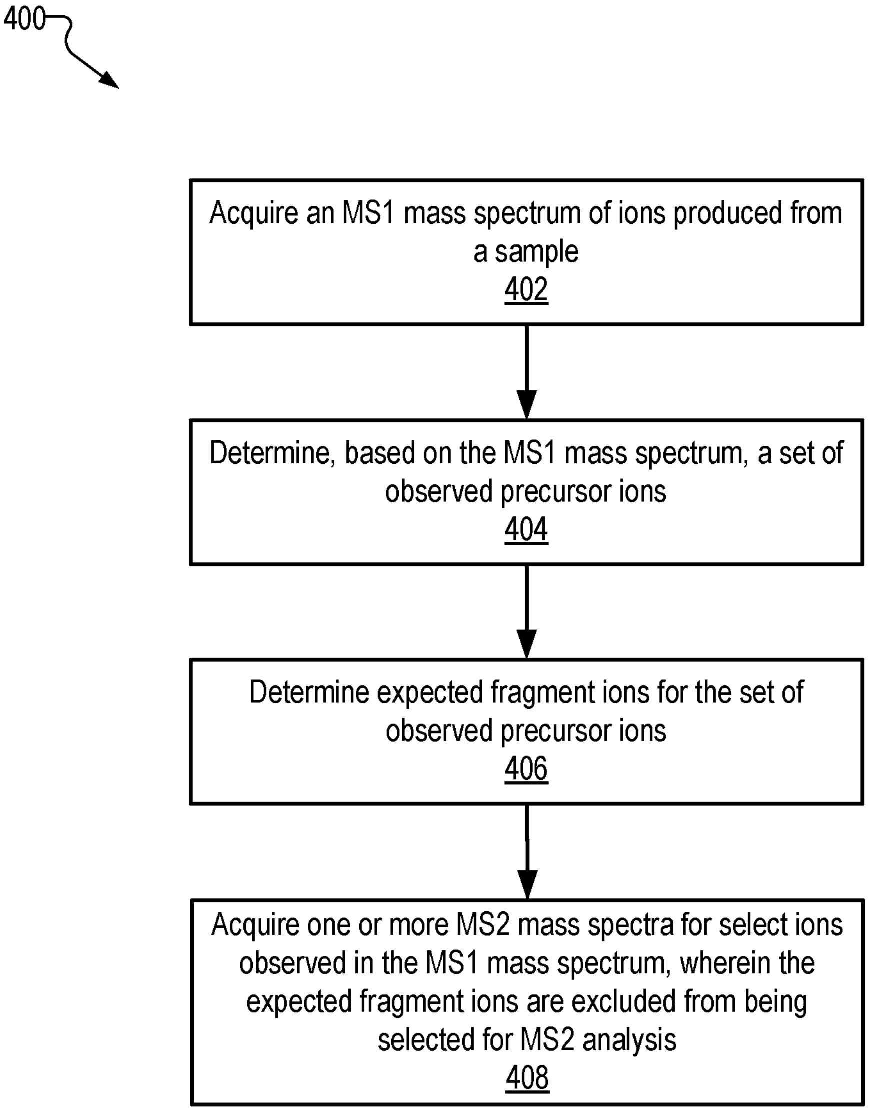
FIG. 4 shows an illustrative method of performing data-dependent tandem mass spectrometry.

FIG. 4 shows an illustrative method 400 of performing data-dependent tandem mass spectrometry. While FIG. 4 shows illustrative operations according to one embodiment, other embodiments may omit, add to, reorder, and/or modify any of the operations shown in FIG. 4. One or more of the operations shown in FIG. 4 may be performed by LC-MS system 100, mass spectrometer 104, and/or system 300, any components included therein, and/or any implementations thereof.

As shown in FIG. 4, method 400 includes acquiring an MS1 mass spectrum of ions produced from a sample at operation 402, determining, based on the MS1 mass spectrum, a set of observed precursor ions at operation 404, determining expected fragment ions for the set of observed precursor ions at operation 406, and acquiring one or more MS2 mass spectra for select ions observed in the MS1 mass spectrum, where the expected fragment ions are excluded from being selected for MS2 analysis at operation 408. Operations 402-408 will now be described in more detail.

In operation 402, an MS1 mass spectrum of ions produced from a sample is acquired. For example, as shown in FIG. 1, liquid chromatograph 102 supplies sample 108 to column 110 and directs components included in sample 108 and that elute from column 110 to mass spectrometer 104. Mass spectrometer 104 performs a first stage of a DDA procedure, which first stage includes performing an MS1 survey scan as the components elute from column 110. Mass spectrometer 104 acquires MS1 data for the MS1 scan, which data may be representative of signals detected by mass spectrometer 104 during the MS1 survey scan. Based on the MS1 data, mass spectrometer 104 generates an MS1 mass spectrum including intensity values of ions produced from the components of sample 108 as a function of m/z of the ions.

Figure 5:
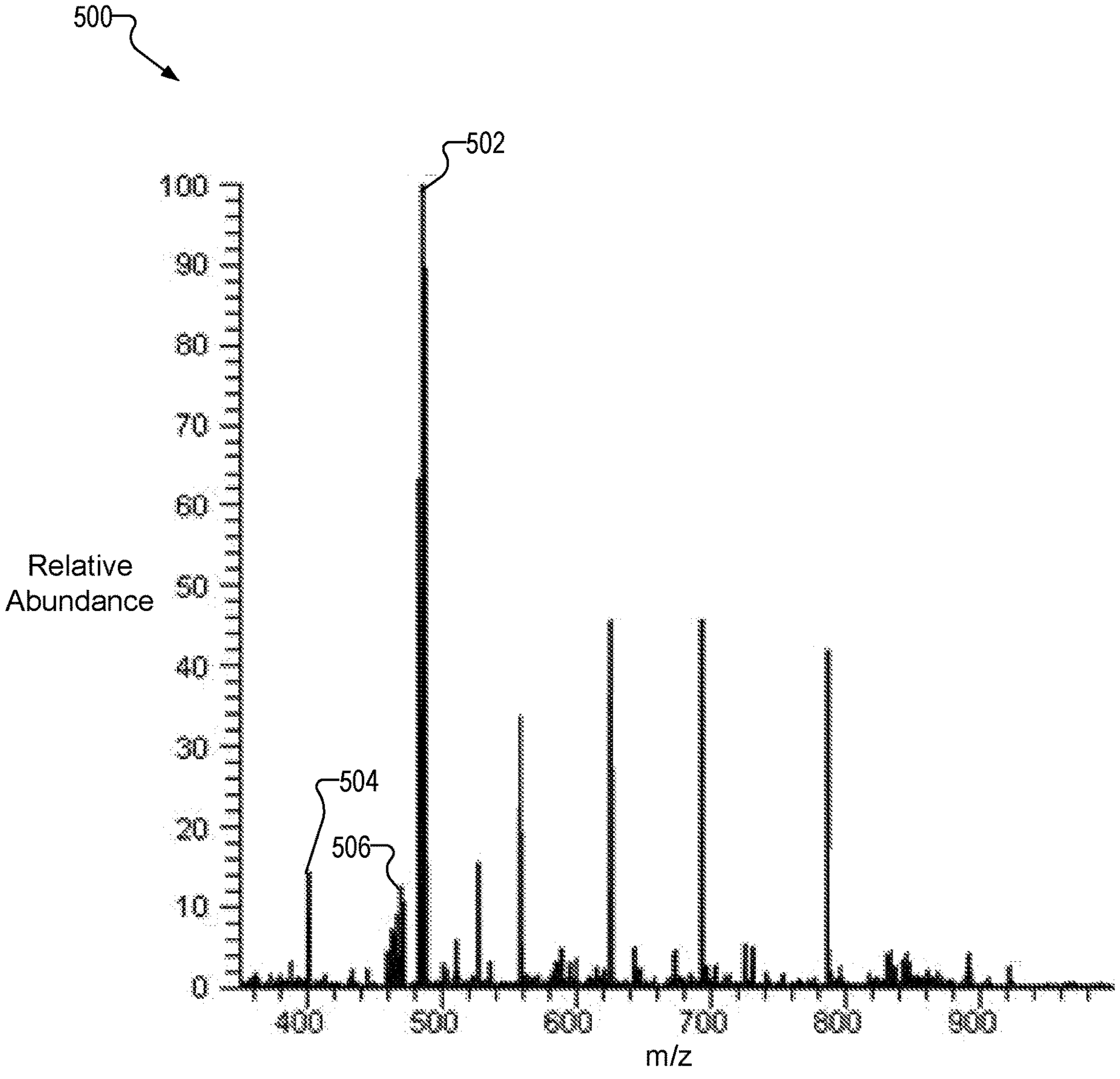
FIG. 5 shows an illustrative mass spectrum.

FIG. 5 shows an illustrative mass spectrum 500 that may be representative of the MS1 mass spectrum acquired at operation 402. Any other suitable mass spectrum for any suitable workflow may be acquired at operation 402. Mass spectrum 500 indicates observed features of the MS1 scan performed by mass spectrometer 104. As shown, mass spectrum 500 represents the intensity values (e.g., relative abundance along the y axis) of ions produced from the components of sample 108 as a function of m/z of the ions (m/z along the x axis). The height of the peaks of plotted data points for a given m/z indicate the relative abundance of ions corresponding to the m/z that are observed by mass spectrometer 104 during the MS1 scan. For example, peak 502, which is a feature of mass spectrum 500 typically referred to as the base peak, indicates that the most abundant ion observed in the MS1 scan has an m/z value of approximately 485.

In a DDA procedure in which mass spectrum 500 is an MS1 mass spectrum, features of mass spectrum 500 will be used by mass spectrometer 104 to select which of the ions observed in the MS1 scan will be subjected to MS2 analysis. To this end, MS2 analysis criteria are defined and used to select which of the observed ions to subject to MS2 analysis. Any simple or complex criteria may be defined and used. As an example, the MS2 analysis criteria may be defined to cause mass spectrometer 104 to select N number of ions that are most abundant in the MS1 scan. As another example, the MS2 analysis criteria may be defined to cause mass spectrometer 104 to select N number of ions that are most abundant within a defined range of m/z values (e.g., m/z values between 400 and 800). As another example, the MS2 analysis criteria may be defined to cause mass spectrometer 104 to select N number of ions that are most abundant within a defined range of m/z values and have charge values of at least 2. Thus, the MS2 analysis criteria may be defined to specify any combination of factors (e.g., intensity, charge state, m/z values, m/z ranges, time periods, isotope distribution, etc.) and rules to be used to select ions for MS2 analysis.

As mentioned above, in a conventional DDA procedure, product ions observed in an MS1 scan may be inadvertently subjected to MS2 analysis when the signals of the product ions satisfy the MS2 analysis criteria. For example, assume that peak 504 represents an observed product ion and peak 506 represents an observed precursor ion. In some cases, based on MS2 analysis criteria, ions having m/z values corresponding to peak 504 (e.g., m/z values of approximately 401) may be selected for MS2 analysis, and ions having m/z values corresponding to peak 506 (e.g., m/z values of approximately 475) may not be selected for MS2 analysis. Method 400 may prevent this undesirable selection of peak 504 from occurring, including in scenarios where signals of observed product ions otherwise satisfy the MS2 analysis criteria.

Returning to FIG. 4, in operation 404, a set of observed precursor ions is determined based on the MS1 mass spectrum. In some embodiments, the determination may be made by comparing ions observed in the MS1 mass spectrum against a precursor ion reference dataset of expected (e.g., predicted) or known precursor ions associated with sample 108. Based on results of the comparison, ions observed in the MS1 mass spectrum that have matches in the precursor ion reference dataset are designated to be a set of observed precursor ions. Accordingly, the set of observed precursor ions represents precursor ions that are expected for sample 108 and are also observed in the MS1 mass spectrum.

The precursor ion reference dataset may include data representative of a mapping of sample 108 to precursor ions that are expected for sample 108. The precursor ion reference dataset may be prepared in advance of the MS1 scan being performed. The precursor ion reference dataset may be stored in any storage facility (e.g., storage facility 302) that is accessible to system 300. The precursor ion reference dataset may be implemented in any suitable format for storing data for access by system 300, such as a database that is populated prior to the MS1 scan. For example, the precursor ion reference dataset may include a peptide database derived from a genome or a previously acquired spectral library.

Where the MS1 mass spectrum is mass spectrum 500 shown in FIG. 5, for example, mass spectrum 500 may be used to determine which of the observed features of mass spectrum 500 represent observed precursor ions that are expected for sample 108. For instance, m/z values observed in mass spectrum 500, such as the m/z values associated with one or more of the peaks (e.g., all the peaks, peaks representing intensities above an intensity threshold, or peaks representing a number of most abundant ions) in mass spectrum 500, may be compared against possible precursor ions in the precursor ion reference dataset. Any of the possible precursor ions in the precursor ion reference dataset that match ions observed in mass spectrum 500 may be added to the designated set of observed precursor ions for mass spectrum 500. For instance, matches may be found in the precursor ion reference dataset for the m/z values associated with peaks 502 and 506 that represent observed precursor ions, while no match is found in the dataset for the m/z value associated with peak 504 that represents an observed product ion. Accordingly, the observed precursor ions are added to the set of observed precursor ions, such as by adding the m/z values of the observed precursor ions to a list of m/z values of observed precursor ions for the MS1 scan.

In operation 406, expected fragment ions for the set of observed precursor ions are determined. This determination may involve different approaches that are selected based on one or more factors such as a sample, an application, and/or a workflow. One or more of these approaches may be referred to as "in-silico" theoretical fragmentation of observed precursor ions.

In some embodiments, the determination of the expected fragment ions for the set of observed precursor ions may be made by accessing, from a fragment ion reference dataset, data indicating expected fragment ions for the set of observed precursor ions. The fragment ion reference dataset may include data representative of mappings of precursor ions to expected fragment ions for the precursor ions. The fragment ion reference dataset may be generated before the MS1 mass spectrum is acquired. The fragment ion reference dataset may be part of or separate from the precursor ion reference dataset accessed in operation 404. The fragment ion reference dataset may be stored in any storage facility (e.g., storage facility 302) that is accessible to system 300. The fragment ion reference dataset may be implemented in any suitable format for storing data for access by system 300, such as a database generated before the acquisition of the MS1 mass spectrum. For example, the expected fragment ions and/or the fragment ion reference dataset indicating the expected fragment ions may be derived from a database digestion, such as by deriving the theoretical b-type and y-type fragment ions for peptides in a genome database.

In other embodiments, the fragment ion reference dataset may be generated using a spectral simulation algorithm to simulate theoretical fragmentation spectra for the set of observed precursor ions. In some implementations, such a spectral simulation algorithm may utilize machine learning models and/or tools to simulate theoretical fragmentation spectra. For example, the INFERYS™ deep learning algorithm by MSAID GmbH (Munich, Germany) provided in the PROTEOME DISCOVERER™ software provided by THERMO FISHER SCIENTIFIC (Waltham, MA) may be used.

In other embodiments, the fragment ion reference dataset may be generated using a spectral library (e.g., before the acquisition of the MS1 mass spectrum). For example, a spectral library of actual experimental MS2 spectra may be substituted for theoretical fragmentation spectra, and the fragment ion reference dataset may be derived from the spectral library. This approach may be used where the MS2 spectral library has comparable spectral quality to the MS1 mass spectrum generated in method 400.

In some embodiments, the determination of the expected fragment ions for the set of observed precursor ions may include performing one or more operations to filter (e.g., by applying one or more filters to) a preliminary set of expected fragment ions to obtain a filtered set of expected fragment ions and designating the filtered set of expected fragment ions to be the expected fragment ions for the set of observed precursor ions. For example, data accessed from a fragment ion reference dataset may provide the preliminary set of expected fragment ions, which is then filtered based on one or more criteria. The filter criteria may include, for example, a precursor ion m/z, a precursor ion charge, a mass analyzer mass accuracy, a fragment ion m/z, a fragment ion charge, frequencies with which ions in the MS1 mass spectrum match to expected fragment ions, frequencies with which ions occur in the preliminary set of expected fragment ions, or any combination or sub-combination of these criteria. To illustrate one example, the determination of the expected fragment ions for the set of observed precursor ions may include determining a preliminary set of expected fragment ions for the set of observed precursor ions, determining frequencies with which ions in the MS1 mass spectrum match to the expected fragment ions in the preliminary set of expected fragment ions, filtering the preliminary set of expected fragment ions based on the frequencies to obtain a filtered set of expected fragment ions, and designating the expected fragment ions in the filtered set of expected fragment ions to be the expected fragment ions for the set of observed precursor ions.

In some applications, methods and systems described herein may be used to analyze complex molecules like proteins, such as in shotgun proteomics workflows. A typical peptide, which may result from digestion of proteins in mixture, can theoretically generate a large number of fragment ions, meaning that a list of expected fragment ions generated in the methods described herein may be quite large. Filters may be defined and used to reduce the size of the list of expected fragment ions. For example, in an illustrative shotgun proteomics workflow, ions of interest may include only fragment ions with m/z values greater than 400 and charge states greater than or equal to 2. Filters, in combination with high-resolution accurate mass (HRAM) spectral quality (e.g., FTMS1 mass accuracy of plus or minus 2 ppm), may be used to limit the number of expected fragment ions that are determined and used to exclude ions from MS2 analysis.

In some use cases, the number of expected fragment ions may be limited to about sixty expected fragment ions per precursor ion. To illustrate, a HeLa proteome database is digested, and the peptide m/z values distributed into 0.004 m/z bins. The peptides in each bin are fragmented into b-type and y-type product ions using simplistic fragmentation rules employed by many database search algorithms (e.g., b-type and y-type fragment ions of charge states 1 and 2), and all product ions with m/z values greater than 400 and charge states greater than or equal to 2 are totaled. The median number of fragment ions per bin is 58.

The determination of expected fragment ions for the set of observed precursor ions may be performed for all precursor ions included in the set of observed precursor ions or for only a select subset of the precursor ions included in the set of observed precursor ions. Making the determination for only a subset of the precursor ions included in the set of observed precursor ions may be computationally less intensive than making the determination for all precursor ions included in the set of observed precursor ions. In certain applications, for example, product ions in the MS1 mass spectrum tend to be only 1% to 10% of the intensity of their precursor ions. For such applications, the determination of expected fragment ions may be performed for only a subset of the most intense ions observed in the MS1 mass spectrum. Intensities of expected fragment ions for lower-intensity MS1 precursor ions will fall beneath an intensity threshold or a detection limit of mass spectrometer 104.

The expected fragment ions determined in operation 406 are used to exclude observed MS1 ions with matching m/z values from being selected for a second stage of the DDA procedure, which second stage may be an MS2 analysis. The exclusion may be performed in any suitable way, such as by making a selection of observed MS1 ions for MS2 analysis based at least in part on the expected fragment ions determined in operation 406 (e.g., based at least in part on the m/z values of the expected fragment ions).

In operation 408, for example, one or more MS2 mass spectra are acquired for select ions observed in the MS1 mass spectrum, where the expected fragment ions determined in operations 406 are excluded from being selected for MS2 analysis. The select ions observed in the MS1 mass spectrum may be selected for MS2 analysis in any suitable way and based on any suitable MS2 analysis criteria. In some embodiments, ions observed in the MS1 mass spectrum that satisfy defined MS2 analysis criteria are identified and any of those identified ions that are included in the expected fragment ions determined in operation 406 are identified and excluded from the MS2 analysis, leaving the remainder of the ions observed in the MS1 mass spectrum that satisfy defined MS2 analysis criteria as the ions selected for MS2 analysis. In other embodiments, any ions observed in the MS1 mass spectrum that have m/z values matching the expected fragment ions determined in operation 406 are excluded from MS2 analysis, and, from the remaining ions observed in the MS1 mass spectrum, ions that satisfy the defined MS2 analysis criteria are selected for MS2 analysis. By basing the selection of MS1 ions for MS2 analysis at least in part on the expected fragment ions determined in operation 406, ions observed in the MS1 spectrum and that match the expected fragment ions (e.g., have matching m/z values) are actively excluded from MS2 analysis. The ions that are selected for MS2 analysis are each subjected to MS2 analysis and corresponding MS2 mass spectra generated based on the MS2 analyses.

In some embodiments, an exclusion list may be used to exclude the expected fragment ions determined in operation 406 from MS2 analysis in operation 408. For example, the expected fragment ions determined in operation 406 may be added to an exclusion list, which is used to exclude the expected fragment ions determined in operation 406 from being selected for MS2 analysis. The exclusion list may be used for any suitable length of time to exclude the expected fragment ions from MS2 analysis. In some implementations, after the suitable length of time, one or more of the expected fragment ions may be removed from the exclusion list if those one or more expected fragment ions stop being observed in the MS1 mass spectrum.

Figure 6:
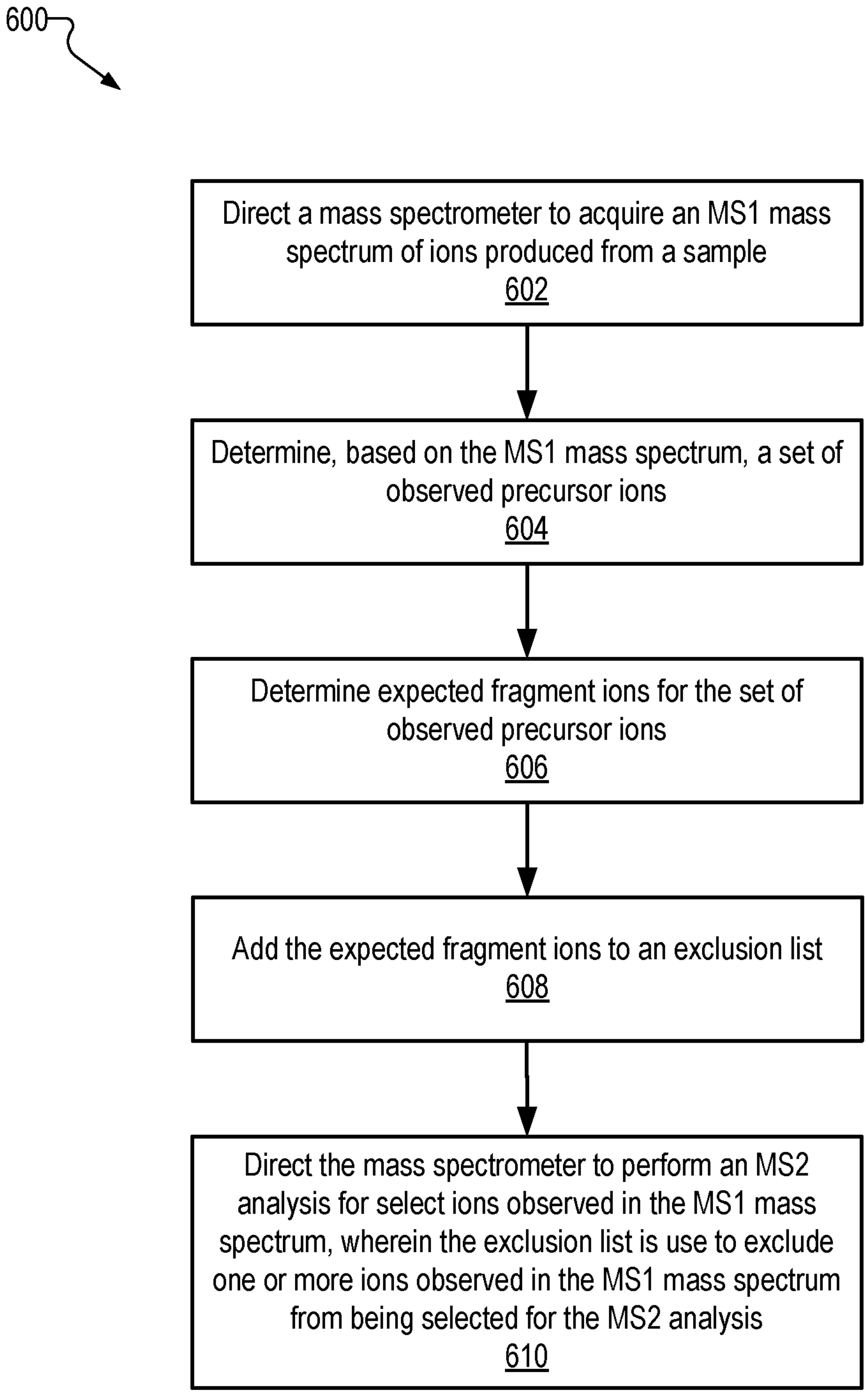
FIG. 6 shows an illustrative method of performing data-dependent tandem mass spectrometry.

FIG. 6 shows an illustrative method 600 of performing data-dependent tandem mass spectrometry. While FIG. 6 shows illustrative operations according to one embodiment, other embodiments may omit, add to, reorder, and/or modify any of the operations shown in FIG. 6. One or more of the operations shown in FIG. 6 may be performed by any component or components of LC-MS system 100, mass spectrometer 104, and/or system 300.

In operation 602, a mass spectrometer is directed (e.g., by system 300) to acquire an MS1 mass spectrum of ions produced from a sample. The acquisition of the MS1 mass spectrum may be performed as in operation 402 of method 400. Operations 604 and 606 of method 600 may be performed similarly to operations 404 and 406, respectively, of method 400. After the expected fragment ions for the set of observed precursor ions are determined at operation 606, data representative of the expected fragment ions is added to an exclusion list at operation 608. This may include adding any information about the expected fragment ions to the exclusion list, including m/z values and/or charge states of the expected fragment ions. The exclusion list may include data implemented in any suitable data format and stored in any suitable storage facility, such as storage facility 302, for example.

In operation 610, the mass spectrometer is directed (e.g., by system 300) to perform an MS2 analysis for select ions observed in the MS1 mass spectrum, where the expected fragment ions determined in operation 606 and added to the exclusion list in operation 608 are excluded from being selected for the MS2 analysis. The mass spectrometer may perform the MS2 analysis to acquire one or more MS2 mass spectra as in operation 410 of method 400. The select ions observed in the MS1 mass spectrum may be selected for MS2 analysis in any suitable way and based on any suitable MS2 analysis criteria. In some embodiments, ions observed in the MS1 mass spectrum that satisfy defined MS2 analysis criteria are identified and any of those identified ions that are included in the exclusion list are identified and excluded from the MS2 analysis, leaving the remainder of the ions observed in the MS1 mass spectrum that satisfy defined MS2 analysis criteria as the ions selected for MS2 analysis. In other embodiments, any ions observed in the MS1 mass spectrum that are included in the exclusion list are identified and excluded (e.g., filtered out). From the remaining ions observed in the MS1 mass spectrum, ions that satisfy the defined MS2 analysis criteria are selected for MS2 analysis. By basing the selection of MS1 ions for MS2 analysis at least in part on the exclusion list, MS1 ions that are represented on the exclusion list (e.g., have matching m/z values) are actively excluded from MS2 analysis.

Figure 7:
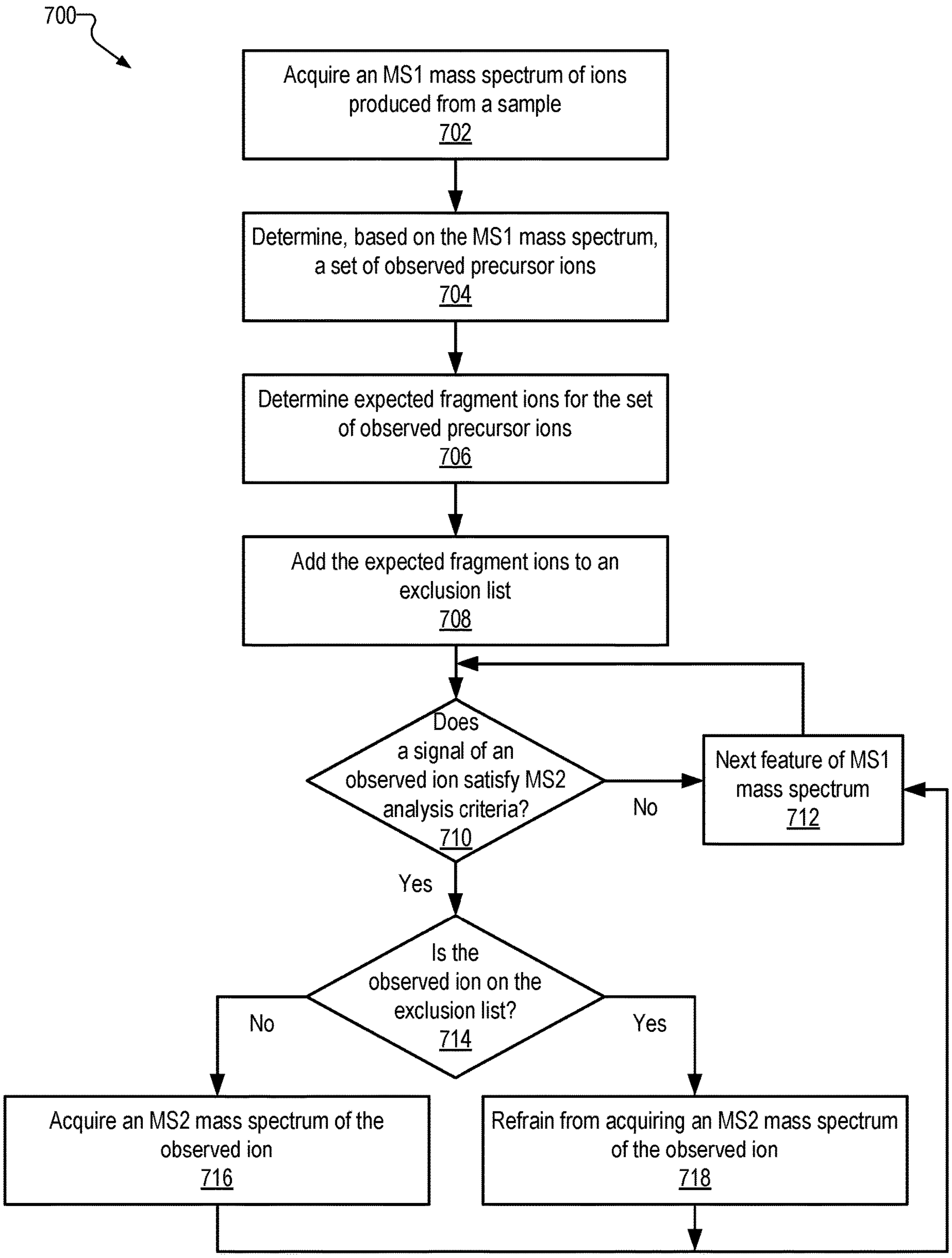
FIG. 7 shows an illustrative method of performing data-dependent tandem mass spectrometry.

FIG. 7 shows an illustrative method 700 of performing data-dependent tandem mass spectrometry. While FIG. 7 shows illustrative operations according to one embodiment, other embodiments may omit, add to, reorder, and/or modify any of the operations shown in FIG. 7. One or more of the operations shown in FIG. 7 may be performed by LC-MS system 100, mass spectrometer 104, and/or system 300, any components included therein, and/or any implementations thereof.

Operations 702, 704, and 706 of method 700 may be performed similarly to operations 402, 404, and 406, respectively, of method 400. After the expected fragment ions for the set of observed precursor ions are determined at operation 706, data representative of the expected fragment ions is added to an exclusion list at operation 708. This may include adding any information about the expected fragment ions to the exclusion list, including m/z values and/or charge states of the expected fragment ions. The exclusion list may include data implemented in any suitable data format and stored in any suitable storage facility, such as storage facility 302, for example.

In operation 710, a determination is made as to whether a signal of an observed MS1 ion satisfies MS2 analysis criteria. If not, processing proceeds to operation 712. In operation 712, the next feature of the MS1 mass spectrum is considered, and method 700 continues at step 710 for the next feature (e.g., a signal of the next observed MS1 ion). On the other hand, if the signal of the observed MS1 ion is determined to satisfy the MS2 analysis criteria at operation 710, processing moves to operation 714.

In operation 714, a determination is made as to whether the observed ion is on the exclusion list. The determination may be made in any suitable way, including by searching the exclusion list for an m/z value of the observed ion to determine if the list includes a matching m/z value for an expected fragment ion.

If the observed ion is determined not to be on the exclusion list, processing moves to operation 716 in which an MS2 mass spectrum is acquired for the observed ion. The acquisition of the MS2 mass spectrum for the observed ion may be performed in any suitable way, such as mass analyzer 204-1 of mass spectrometer 104 directing ions having the m/z values of the observed ion to collision cell 204-2, where the ions undergo one or more dissociation processes to produce product ions that are directed to mass analyzer 204-3. Mass analyzer 204-3 filters and detects the product ions and sends data representative of the detections to controller 206. Based on the data, controller 206 generates the MS2 mass spectrum of product ions produced by fragmenting the observed MS1 ion. Processing then proceeds from operation 716 to operation 712. In operation 712, the next feature of the MS1 mass spectrum is considered, and method 700 continues at step 710 for the next feature (e.g., a signal of the next observed MS1 ion).

On the other hand, if in operation 714 the observed ion is determined to be on the exclusion list, processing moves to operation 718 in which mass spectrometer 104 refrains from acquiring an MS2 mass spectrum of the observed ion. The refraining from acquisition of the MS2 mass spectrum for the observed ion may be performed in any suitable way, including by controller 206 directing mass spectrometer 104 to refrain from MS2 analysis of the observed ion (which direction may include not directing mass spectrometer 104 to acquire an MS2 mass spectrum for the observed ion). Processing then proceeds from operation 718 to operation 712. In operation 712, the next feature of the MS1 mass spectrum is considered, and method 700 continues at step 710 for the next feature (e.g., a signal of the next observed MS1 ion).

Performance of operations 710-718 may be repeated for other features of the MS1 mass spectrum until there are no remaining features of the MS1 mass spectrum to be considered, or the DDA procedure is terminated for another reason. For example, in some examples, a first pass through operations 710-718 for a first observed ion may include determining, based on the MS1 mass spectrum, that a signal of the first observed ion satisfies MS2 analysis criteria, determining that the first observed ion is not on the exclusion list, and acquiring an MS2 mass spectrum of the first observed ion (e.g., by directing ions having m/z values matching the observed ion through mass analyzer 204-1 to collision cell 204-2 for fragmentation, and the product ions being directed to mass analyzer 204-3 for filtering and detection of signals that are used to generate the MS2 mass spectrum). Another feature of the MS1 mass spectrum, such as an additional or second observed ion, may then be considered in a second pass through operations 710-718. The second pass may include determining, based on the MS1 mass spectrum, that a signal of the second observed ion satisfies MS2 analysis criteria, determining that the second observed ion is on the exclusion list, and refraining from acquiring an MS2 mass spectrum of the second observed ion (e.g., by refraining from directing ions having m/z values matching the observed ion through mass analyzer 204-1 to collision cell 204-2 for fragmentation and analysis). Additional passes through operations 710-718 may be performed for additional features observed in the MS1 mass spectrum.

In certain embodiments, the exclusion list may be adjusted after one or more MS1 ions have been subjected to MS2 analysis, based on observations from the MS2 analysis. For example, after the MS2 mass spectrum is acquired for an observed ion in operation 716, the exclusion list may be refined based on observed fragment ions observed in the MS2 mass spectrum. In some examples, the refinement includes replacing, in the exclusion list, data representative of one or more of the expected fragment ions (e.g., all the expected fragment ions added to the list in operation 708) with data representative of one or more of the observed fragment ions observed in the MS2 mass spectrum. In some examples, the refinement includes adding, to the exclusion list, data representative of any of the observed fragment ions that are not duplicative of the expected fragment ions already represented in the exclusion list. In some examples, the refinement includes removing, from the exclusion list any of the expected fragment ions that are not among the fragment ions observed in the MS2 analysis.

Such dynamic adaptation of the expected fragment ions based on observations from one or more actual MS2 scans may address situations in which the expected fragment ions that are predicted to be present are not actually present or do not include ions that are actually present. This refinement may conserve processing resources of mass spectrometer 104 and/or improve accuracy of the DDA procedure.

In some embodiments, a scoring algorithm may be defined and used to determine and assign fragment-ion-likelihood scores to ions observed in the MS1 mass spectrum. An assigned score may represent a determined likelihood that an observed ion is a fragment ion of a precursor ion of a sample. The assigned scores may be compared against a score threshold and the results of the comparison may be used to determine whether to select observed ions for MS2 analysis or exclude observed ions from MS2 analysis. For example, ions having assigned scores above the threshold (or below the threshold in alternative implementations) may be excluded from selection for MS2 analysis. Thus, based on a scoring algorithm, a fragment-ion-likelihood score may be determined for an ion observed in the MS1 mass spectrum and the ion excluded from being selected for MS2 analysis based on the fragment-ion-likelihood score satisfying a defined score threshold. In some embodiments, MS2 scans may be performed in an order that is selected based on fragment-ion-likelihood scores. For example, a subset of the ions observed in the MS1 mass spectrum may be selected for MS2 analysis, in order from lowest to highest fragment-ion-likelihood scores. In some implementations, MS1 peaks in the MS1 mass spectrum may be sorted based on the fragment-ion-likelihood scores, and MS2 scans may be performed in an order of least-to-most likely.

The scoring algorithm may be defined for use in determining the scores in any suitable way and using any suitable criteria. As an example, the scoring algorithm may be defined to determine the frequencies with which observed ions in the MS1 mass spectrum match expected fragment ions. The more fragment ions matching a given ion in the MS1 spectrum, the higher the score. Ions that are assigned scores indicative of determined frequencies that satisfy a threshold frequency may be excluded from MS2 analysis. Examples of factors that may be considered by the scoring algorithm in determining scores may include, without limitation, how many datasets of expected ions (e.g., datasets of in-silico digests) produce a match for an observed ion, a signal to noise (S/N) ratio of the observed ion, a mass accuracy of an observed ion relative to an expected fragment ion, or any weighted or unweighted combination or sub-combination of such factors.

In some embodiments, a scoring algorithm may be defined and used to determine and assign fragment-ion-likelihood scores to ions observed in the MS1 mass spectrum in implementations in which expected fragment ions that are determined from an MS1 mass spectrum and observed fragment ions that are observed in one or more MS2 spectra of a DDA procedure are used to determine whether ions observed in the MS1 mass spectrum are subjected to MS2. In an illustrative implementation, for example, every ion observed in the MS1 mass spectrum may be assigned a "fragment ion likelihood" score. MS1 ions that do not match any expected fragment ions or observed real time search MS2 fragment ions are assigned a value of '0'. MS1 ions that match an observed real time search MS2 fragment ion are assigned a value of '1'. MS1 ions that match only expected fragment ions are assigned an intermediate value between '0' and '1'. The intermediate value may be determined depending upon any suitable factors, including any of the illustrative factors described herein. For example, the intermediate value may be determined based on how many datasets of expected ions (e.g., datasets of in-silico digests) produce a match for an observed ion, a signal to noise (S/N) ratio of the observed ion, a mass accuracy of an observed ion relative to an expected fragment ion, or any weighted or unweighted combination or sub-combination of such factors.

The level of specificity to be employed during performance of a DDA procedure may be defined, such as based on user input received by way of a user interface of the mass spectrometer (e.g., from a user inputting the level of specificity to be employed during the DDA procedure). The level of specificity may be defined to be any value between '0' and '1', where '0' would be the most restrictive form of data-dependent sampling and '1' would be the most inclusive. The level of specificity may be set as the threshold against which assigned fragment-ion-likelihood scores are compared. Alternatively, in some embodiments, precursors ions in the MS1 spectrum may be targeted for MS2 analysis in order from lowest to highest fragment-ion-likelihood scores, as mentioned above.

In some embodiments, a DDA procedure may be performed in real time or near real time as part of a method of data-dependent tandem mass spectrometry. For example, operations of any of the methods described herein may be performed in real time or near real time as part of a method of data-dependent tandem mass spectrometry. This may include real-time searching of ions observed in an MS1 mass spectrum to dynamically select, from those ions, which ions to subject to or exclude from MS2 analysis.

While certain examples are described herein in the context of tandem mass spectrometry, illustrative systems and methods described herein may be implemented and used for data-dependent mass spectrometry in any suitable mass spectrometry configuration, such as in any multi-stage mass spectrometer. Moreover, while certain illustrative examples are described herein in the context of fragment ions being identified and excluded from MS2 analysis, the principles described herein may be applied to any version of a precursor ion, including to adducts of a precursor ion.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions such as a computer program product embodied on the computer-readable medium) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
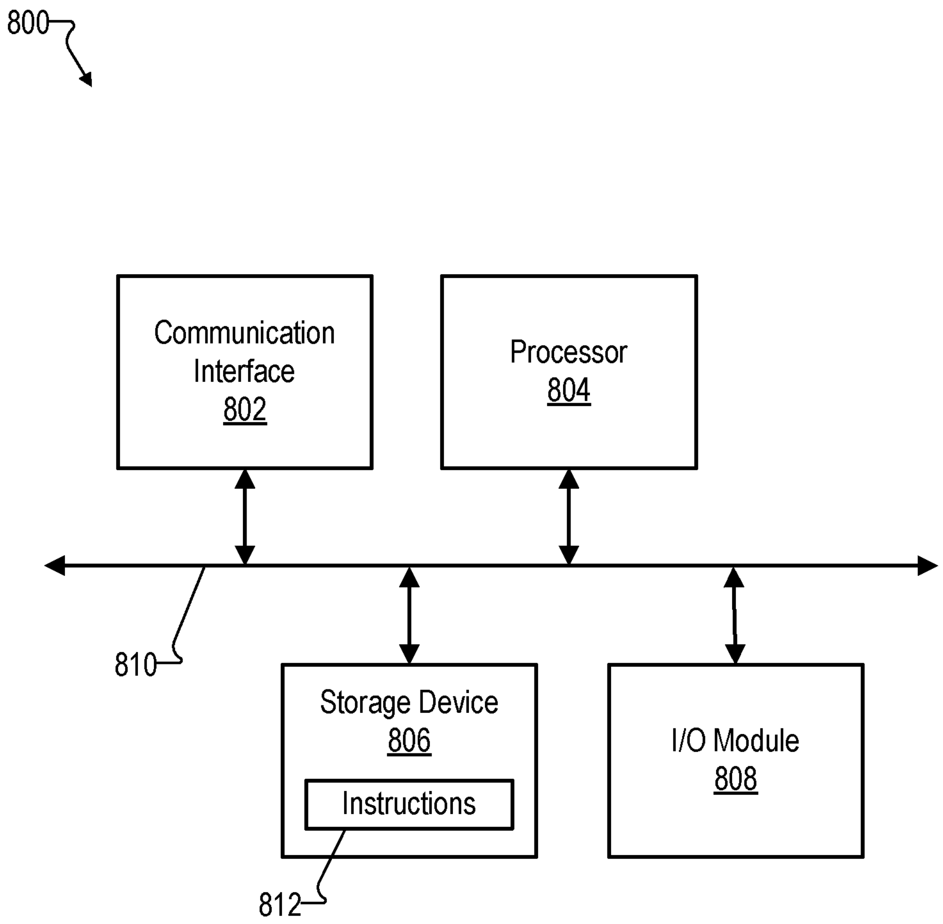
FIG. 8 shows an illustrative computing device.

FIG. 8 shows an illustrative computing device 800 that may be specifically configured to perform one or more of the processes described herein. As shown in FIG. 8, computing device 800 may include a communication interface 802, a processor 804, a storage device 806, and an input/output ("I/O") module 808 communicatively connected one to another via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 800. For example, storage facility 302 may be implemented by storage device 806, and processing facility 304 may be implemented by processor 804.

Advantages and features of the present disclosure can be further described by the following statements:

1. A system for performing data-dependent tandem mass spectrometry, the system comprising: a memory storing instructions; and a processor communicatively coupled to the memory and configured to execute the instructions to: direct a mass spectrometer to acquire an MS1 mass spectrum of ions produced from a sample; determine, based on the MS1 mass spectrum, a set of observed precursor ions; determine expected fragment ions for the set of observed precursor ions; add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.
2. The system of statement 1, wherein the processor is further configured to execute the instructions to: determine that a signal for an ion observed in the MS1 mass spectrum satisfies MS2 analysis criteria; and exclude the ion observed in the MS1 mass spectrum from being selected for the MS2 analysis based on the exclusion list.
3. The system of statement 2, wherein the MS2 analysis criteria comprise at least one of an intensity threshold, a charge state, or an isotope distribution.
4. The system of any of the preceding statements, wherein the determining the set of observed precursor ions comprises: comparing ions observed in the MS1 mass spectrum against a dataset of expected precursor ions associated with the sample; and designating ions observed in the MS1 mass spectrum that have matches in the dataset to be the set of observed precursor ions.
5. The system of any of the preceding statements, wherein the determining the expected fragment ions for the set of observed precursor ions comprises: accessing, from a dataset, data indicating the expected fragment ions for the set of observed precursor ions.
6. The system of statement 5, wherein the dataset is generated based on a spectral library before acquisition of the MS1 mass spectrum.

7. The system of statement 5, wherein the dataset is generated using a spectral simulation algorithm to simulate theoretical fragmentation spectra for the set of observed precursor ions.
8. The system of statement 5, wherein the determining the expected fragment ions for the set of observed precursor ions further comprises: filtering the data of the dataset based on one or more of a precursor ion m/z, a precursor ion charge, a mass analyzer mass accuracy, a fragment ion m/z, or a fragment ion charge.
9. The system of any of the preceding statements, wherein the determining the expected fragment ions for the set of observed precursor ions comprises: determining a preliminary set of expected fragment ions for the set of observed precursor ions; determining frequencies with which ions in the MS1 mass spectrum match to the expected fragment ions in the preliminary set of expected fragment ions; filtering the preliminary set of expected fragment ions based on the frequencies to obtain a filtered set of expected fragment ions; and designating the expected fragment ions in the filtered set of expected fragment ions to be the expected fragment ions for the set of observed precursor ions.
10. The system of any of the preceding statements, wherein the processor is further configured to execute the instructions to: refine the exclusion list based on observed fragment ions observed in the MS2 analysis.
11. The system of statement 10, wherein the refining the exclusion list based on the observed fragment ions observed in the MS2 analysis comprises: replacing, in the exclusion list, the expected fragment ions with the observed fragment ions observed in the MS2 analysis.
12. The system of statement 10, wherein the refining the exclusion list based on the observed fragment ions observed in the MS2 analysis comprises: adding, to the exclusion list, any of the observed fragment ions that are not duplicative of the expected fragment ions in the exclusion list.
13. The system of statement 10, wherein the refining the exclusion list based on the fragment ions observed in the MS2 analysis comprises: removing, from the exclusion list, any of the expected fragment ions that are not among the fragment ions observed in the MS2 analysis.
14. The system of any of the preceding statements, wherein the processor is further configured to execute the instructions to: determine, based on a scoring algorithm, a fragment-ion-likelihood score for an ion observed in the MS1 mass spectrum; and exclude the ion observed in the MS1 mass spectrum from being selected for the MS2 analysis based on the fragment-ion-likelihood score.
15. The system of any of the preceding statements, wherein the processor is further configured to execute the instructions to: determine, based on a scoring algorithm, fragment-ion-likelihood scores for ions observed in the MS1 mass spectrum; and select a subset of the ions observed in the MS1 mass spectrum for MS2 analysis, wherein ions in the subset are selected in order from lowest to highest fragment-ion-likelihood scores.
16. A non-transitory computer-readable medium storing instructions that, when executed, direct at least one processor of a computing device to: direct a mass spectrometer to acquire an MS1 mass spectrum of ions produced from a sample; determine, based on the MS1 mass spectrum, a set of observed precursor ions; determine expected fragment ions for the set of observed precursor ions; add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.
17. The non-transitory computer-readable medium of statement 16, wherein the instructions, when executed, further direct the at least one processor to: acquire an MS2 mass spectrum based on the MS2 analysis of one of the select ions observed in the MS1 mass spectrum; and refine the exclusion list based on observed fragment ions observed in the MS2 analysis.
18. The non-transitory computer-readable medium of any of statements 16-17, wherein the instructions, when executed, further direct the at least one processor to: determine that a signal for an ion observed in the MS1 mass spectrum satisfies MS2 analysis criteria; and exclude the ion observed in the MS1 mass spectrum from being selected for the MS2 analysis based on the exclusion list.
19. A method of performing data-dependent tandem mass spectrometry, the method comprising: acquiring, by a mass spectrometer, an MS1 mass spectrum of ions produced from a sample; determining, by the mass spectrometer and based on the MS1 mass spectrum, a set of observed precursor ions; determining, by the mass spectrometer, expected fragment ions for the set of observed precursor ions; and acquiring, by the mass spectrometer, one or more MS2 mass spectra for select ions observed in the MS1 mass spectrum, wherein the expected fragment ions are excluded from being selected for MS2 analysis.
20. The method of statement 19, further comprising: determining, by the mass spectrometer and based on a scoring algorithm, a fragment-ion-likelihood score for an ion observed in the MS1 mass spectrum; and excluding, by the mass spectrometer, the ion observed in the MS1 mass spectrum from being selected for the MS2 analysis based on the fragment-ion-likelihood score.
21. The method of any statement 20, further comprising: determining that the fragment-ion-likelihood score for the ion observed in the MS1 mass spectrum satisfies a threshold; wherein the excluding the ion from being selected for the MS2 analysis is based on the determining that the fragment-ion-likelihood score for the ion observed in the MS1 mass spectrum satisfies a threshold.
22. The method of statement 21, further comprising defining the threshold based on user input received by way of a user interface of the mass spectrometer.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system for performing data-dependent tandem mass spectrometry, the system comprising:

a memory storing instructions; and a processor communicatively coupled to the memory and configured to execute the instructions to:

direct a mass spectrometer to acquire an MS1 mass spectrum of ions produced from a sample;

determine, based on the MS1 mass spectrum, a set of observed precursor ions;

determine expected fragment ions for the set of observed precursor ions, wherein determining the expected fragment ions for the set of observed precursor ions comprises:

accessing, from a dataset, data indicating the expected fragment ions for the set of observed precursor ions; and filtering the data of the dataset based on one or more of a precursor ion m/z, a precursor ion charge, a mass analyzer mass accuracy, a fragment ion m/z, or a fragment ion charge add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.

2. The system of claim 1, wherein the processor is further configured to execute the instructions to:

determine that a signal for an ion observed in the MS1 mass spectrum satisfies MS2 analysis criteria; and exclude the ion observed in the MS1 mass spectrum from being selected for the MS2 analysis based on the exclusion list.

3. The system of claim 2, wherein the MS2 analysis criteria comprise at least one of an intensity threshold, a charge state requirement, or an expected isotope distribution.

4. The system of claim 1, wherein the determining the set of observed precursor ions comprises:

comparing ions observed in the MS1 mass spectrum against a dataset of expected precursor ions associated with the sample; and designating ions observed in the MS1 mass spectrum that have matches in the dataset to be the set of observed precursor ions.

5. The system of claim 1, wherein the dataset is generated based on a spectral library before acquisition of the MS1 mass spectrum.

6. The system of claim 1, wherein the dataset is generated using a spectral simulation algorithm to simulate theoretical fragmentation spectra for the set of observed precursor ions.

7. The system of claim 1, wherein the determining the expected fragment ions for the set of observed precursor ions comprises:

determining a preliminary set of expected fragment ions for the set of observed precursor ions;

determining frequencies with which ions occur in the preliminary set of expected fragment ions;

filtering the preliminary set of expected fragment ions based on the frequencies to obtain a filtered set of expected fragment ions; and designating the expected fragment ions in the filtered set of expected fragment ions to be the expected fragment ions for the set of observed precursor ions.

8. The system of claim 1, wherein the processor is further configured to execute the instructions to:

refine the exclusion list based on fragment ions observed in the MS2 analysis.

9. The system of claim 8, wherein the refining the exclusion list based on the fragment ions observed in the MS2 analysis comprises:

replacing, in the exclusion list, the expected fragment ions with the observed fragment ions observed in the MS2 analysis.

10. The system of claim 8, wherein the refining the exclusion list based on the fragment ions observed in the MS2 analysis comprises:

adding, to the exclusion list, any of the observed fragment ions that are not duplicative of the expected fragment ions in the exclusion list.

11. The system of claim 8, wherein the refining the exclusion list based on the fragment ions observed in the MS2 analysis comprises:

removing, from the exclusion list, any of the expected fragment ions that are not among the fragment ions observed in the MS2 analysis.

12. The system of claim 1, wherein the processor is further configured to execute the instructions to:

determine, based on a scoring algorithm, a fragment-ion-likelihood score for an ion observed in the MS1 mass spectrum; and exclude the ion observed in the MS1 mass spectrum from being selected for the MS2 analysis based on the fragment-ion-likelihood score.

13. The system of claim 1, wherein the processor is further configured to execute the instructions to:

determine, based on a scoring algorithm, fragment-ion-likelihood scores for ions observed in the MS1 mass spectrum; and select a subset of the ions observed in the MS1 mass spectrum for MS2 analysis, wherein ions in the subset are selected in order from lowest to highest fragment-ion-likelihood scores.

14. A non-transitory computer-readable medium storing instructions that, when executed, direct at least one processor of a computing device to:

direct a mass spectrometer to acquire an MS1 mass spectrum of ions produced from a sample;

determine, based on the MS1 mass spectrum, a set of observed precursor ions;

determine expected fragment ions for the set of observed precursor ions, wherein the determining the expected fragment ions for the set of observed precursor ions comprises:

accessing, from a dataset, data indicating the expected fragment ions for the set of observed precursor ions; and filtering the data of the dataset based on one or more of a precursor ion m/z, a precursor ion charge, a mass analyzer mass accuracy, a fragment ion m/z, or a fragment ion charge;

add the expected fragment ions to an exclusion list; and direct the mass spectrometer to perform an MS2 analysis for select ions observed in the MS1 mass spectrum, wherein the exclusion list is used to exclude one or more ions observed in the MS1 mass spectrum from being selected for the MS2 analysis.

15. The non-transitory computer-readable medium of claim 14, wherein the instructions, when executed, further direct the at least one processor to:

acquire an MS2 mass spectrum based on the MS2 analysis of one of the select ions observed in the MS1 mass spectrum; and refine the exclusion list based on observed fragment ions observed in the MS2 analysis.

16. The non-transitory computer-readable medium of claim 14, wherein the instructions, when executed, further direct the at least one processor to:

determine that a signal for an ion observed in the MS1 mass spectrum satisfies MS2 analysis criteria; and exclude the ion observed in the MS1 mass spectrum from being selected for the MS2 analysis based on the exclusion list.

17. A method of performing data-dependent tandem mass spectrometry, the method comprising:

acquiring, by a mass spectrometer, an MS1 mass spectrum of ions produced from a sample;

determining, by the mass spectrometer and based on the MS1 mass spectrum, a set of observed precursor ions;

determining, by the mass spectrometer, expected fragment ions for the set of observed precursor ions, wherein the determining the expected fragment ions for the set of observed precursor ions comprises:

accessing, from a dataset, data indicating the expected fragment ions for the set of observed precursor ions; and filtering the data of the dataset based on one or more of a precursor ion m/z, a precursor ion charge, a mass analyzer mass accuracy, a fragment ion m/z, or a fragment ion charge; and acquiring, by the mass spectrometer, one or more MS2 mass spectra for select ions observed in the MS1 mass spectrum, wherein the expected fragment ions are excluded from being selected for MS2 analysis.

18. The method of claim 17, further comprising:

determining, by the mass spectrometer and based on a scoring algorithm, a fragment-ion-likelihood score for an ion observed in the MS1 mass spectrum; and excluding, by the mass spectrometer, the ion observed in the MS1 mass spectrum from being selected for the MS2 analysis based on the fragment-ion-likelihood score.

19. The method of claim 18, further comprising:

determining that the fragment-ion-likelihood score for the ion observed in the MS1 mass spectrum satisfies a threshold;

wherein the excluding the ion from being selected for the MS2 analysis is based on the determining that the fragment-ion-likelihood score for the ion observed in the MS1 mass spectrum satisfies a threshold.

20. The method of claim 19, further comprising defining the threshold based on user input received by way of a user interface of the mass spectrometer.

* * * * *